United States Patent [19]

Muraoka

[11] 3,711,586
[45] Jan. 16, 1973

[54] METHOD OF INCREASING TENSILE STRENGTH OF PLASTIC MATERIALS

[75] Inventor: James S. Muraoka, Oxnard, Calif. 93030

[73] Assignee: The United States of America as represented by the Secretary of the Navy

[22] Filed: March 18, 1971

[21] Appl. No.: 125,827

[52] U.S. Cl. .................................264/88, 264/340
[51] Int. Cl. ..........................B29c 23/00, B29c 25/00
[58] Field of Search.......57/156 R, 160, 162; 264/88, 264/93, 232, 231, 291, 319, 340, 280, 294

[56] References Cited

UNITED STATES PATENTS 3,507,941   4/1970   Kies et al. ............................. 264/88
3,043,086   7/1962   Hood ................................. 57/157 R
3,048,963   8/1962   Himmelfarb et al. ............... 57/157 R

OTHER PUBLICATIONS

Sasaki et al, "New Current Meters", Deep Sea Research, Pergamon Press, London, Vol. 12, No. 6, Dec. 1965, pages 815, 817, 818, 821 relied on.

*Primary Examiner*—Robert F. White
*Assistant Examiner*—Willard E. Hoag
*Attorney*—Richard S. Sciascia, Q. Baxter Warner and Gayward N. Mann

[57] ABSTRACT

Plastic ropes composed of polyethylene and polypropylene strands exposed to high hydrostatic pressure materially increase in tensile strength without a corresponding increase in strand diameter.

2 Claims, No Drawings

METHOD OF INCREASING TENSILE STRENGTH OF PLASTIC MATERIALS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The invention relates generally to plastic rope strands and more particularly relates to a method of increasing tensile strength of polyethylene and polypropylene rope strands.

2. Description of the Prior Art

Most rope specimens when submitted to high hydrostatic pressures encountered at great ocean depths will suffer some deterioration including considerable reduction in their breaking strength. However, rope strands manufactured of certain plastic materials (polypropylene and polyethylene) contrary to expectations tend to increase in tensile strength with a corresponding enhancement of breaking strength when subjected to high hydrostatic pressures. This phenomenon is probably due to a reorientation of the molecular chain structure.

SUMMARY OF THE INVENTION

Briefly, the present invention involves a rope, the strands being manufactured of polypropylene or polyethylene which has been subjected to a high hydrostatic pressure. Polypropylene and polyethylene strands thus treated show a remarkable increase in tensile strength as compared to non-pressure treated strands.

STATEMENT OF THE OBJECTS OF THE INVENTION

Accordingly, it is an object of the present invention to provide plastic rope strands of enhanced strength characteristics.

Another object is to provide a lightweight yet strong rope for a variety of purposes.

Another object is to provide a strong plastic rope having enhanced strength characteristics by subjecting rope strands of polypropylene or polyethylene to high hydrostatic pressure.

Other objects, advantages and novel features of the invention will become apparent from the following detailed description of the invention.

DESCRIPTION OF THE PREFERRED EMBODIMENT

The present invention comprises a rope manufactured from either polyethylene or polypropylene strands which are subjected to a hydrostatic pressure of about 10,000 psi for about 6 to 7 continuous hours. The thus treated "polyethylene and polypropylene ropes" when tested showed an increase in tensile strength as compared to non-pressure treated rope materials.

It should be noted that although the present process is particularly adaptable to enhancing the strength of elongated rope strands of polyethylene or polypropylene, other design configurations may also be employed. For example cords, tubing rods, cubes and practically any other configuration of polyethylene or polypropylene may be treated by the present process with a resultant material increase in tensile strength.

For confirmation purposes, six 2-foot long test specimens were cut from a roll of continuous length rope having strands of both polyethylene and polypropylene. Three each of these ropes were placed inside a nine-inch diameter pressure vessel filled with water and 10,000 psi of hydrostatic pressure was applied for 6.5 continuous hours. The results of a tensile strength test on these ropes as compared to non-pressure treated ropes is shown in Table I.

TABLE I

Breaking Strength of Rope Specimens Before and After Exposure to 10,000 psi Hydrostatic Pressure

| Rope Specimen | Breaking Strength (lbs) | | Change |
|---|---|---|---|
| | Non-Pressure Treated Control | Pressure Treated | |
| Polypropylene Strands | 1175 | 1300 | |
| Polypropylene Strands | 1175 | 1312 | 8.8% gain in strength |
| Polypropylene Strands | 1175 | 1225 | |
| | 1175 (avg) | 1279 (avg) | |
| Polyethylene Strands | 962 | 1100 | |
| Polyethylene Strands | 937 | 1170 | 11% gain in strength |
| Polyethylene Strands | 1175 | 1180 | |
| | 1025 (avg) | 1150 (avg) | |

Table II which follows dramatically compares the breaking strength of cotton, manilla and nylon rope specimens in a dry condition both before and after high hydrostatic pressure exposure. The tests show that cotton and manila rope specimens lost about 47 percent and 46 percent of their original strength. Nylon rope had lost about 29 percent of its strength.

TABLE II

Breaking Strength of Rope Specimens Before and After 4,640 psi Hydrostatic Pressure Exposure Maintained for Six Months

| Rope Specimen | Breaking Strength (lbs) | | Change |
|---|---|---|---|
| | Non-Pressure Treated Control | Pressure Treated | |
| Cotton | 1700 | 1000 | Covered with slime; |
| " | 1755 | 777 | Decayed fibers; 47% loss in strength |
| " | 1785 | 890 | |
| | 1713 (avg) | 889 (avg) | |
| Manila | 2300 | 1325 | Covered with slime; |
| " | 2585 | 975 | Fibers damaged; 46% loss in strength |
| " | 2360 | 1375 | |
| " | — | 1500 | |
| | 2415 (avg) | 1294 (avg) | |

| Nylon | 1437 | 1137 | Light slime growth; |
| | 1652 | 1040 | 29% loss in strength |
| " | 1537 | 1100 | |
| " | 1550 | — | |
| | 1544 (avg) | 1092 (avg) | |

It is clear from a comparison of Tables I and II that a dramatic and unexpected result is obtained by subjecting ropes having polyethylene or polypropylene strands to excessive hydrostatic pressure. These ropes are increased in breaking strength without an increase in strand diameter, whereas most other commonly used rope strands are reduced in breaking strength regardless of the diameter.

Obviously many modifications and variations of the present invention are possible in the light of the above teachings. It is therefore to be understood that within the scope of the appended claims the invention may be practiced otherwise than as specifically described.

I claim:

1. A method for increasing the tensile strength of plastic material selected from the group consisting of polyethylene and polypropylene, said method comprising: placing a length of said material in a pressure vessel, filling said vessel with water and applying hydrostatic pressure of about 10,000 psi for not less than six hours nor more than seven hours.

2. The method of claim 1 wherein said material is in the form of a rope.

* * * * *